United States Patent
Zhou et al.

(10) Patent No.: US 9,094,778 B2
(45) Date of Patent: Jul. 28, 2015

(54) AUTONOMOUS ADAPTATION OF DISCOVERY PACKET TRANSMISSION FREQUENCY

(71) Applicant: Qualcomm Incorporated, San Diego, CA (US)

(72) Inventors: Yan Zhou, San Diego, CA (US); Santosh Paul Abraham, San Diego, CA (US); Hemanth Sampath, San Diego, CA (US)

(73) Assignee: QUALCOMM Incorporated, San Diego, CA (US)

( * ) Notice: Subject to any disclaimer, the term of this patent is extended or adjusted under 35 U.S.C. 154(b) by 143 days.

(21) Appl. No.: 13/782,220

(22) Filed: Mar. 1, 2013

(65) Prior Publication Data
US 2014/0247819 A1    Sep. 4, 2014

(51) Int. Cl.
*H04W 8/00* (2009.01)
*H04L 29/08* (2006.01)
*H04W 84/18* (2009.01)

(52) U.S. Cl.
CPC ........... *H04W 8/005* (2013.01); *H04L 67/1061* (2013.01); *H04W 84/18* (2013.01)

(58) Field of Classification Search
None
See application file for complete search history.

(56) References Cited

U.S. PATENT DOCUMENTS

| 6,975,614 | B2 | 12/2005 | Kennedy |
| 7,180,884 | B2 | 2/2007 | Elliott et al. |
| 7,916,666 | B2 * | 3/2011 | Yoon et al. ............... 370/255 |
| 8,184,610 | B2 | 5/2012 | Strutt et al. |
| 2005/0249170 | A1 | 11/2005 | Salokannel et al. |
| 2009/0262663 | A1 * | 10/2009 | Gosset et al. ............. 370/254 |
| 2011/0121949 | A1 * | 5/2011 | Guo et al. ............... 340/10.2 |
| 2012/0120871 | A1 * | 5/2012 | Jaeger ..................... 370/328 |
| 2012/0182890 | A1 | 7/2012 | Li et al. |

FOREIGN PATENT DOCUMENTS

| EP | 1708439 A1 | 10/2006 |
| EP | 2453705 A1 | 5/2012 |

OTHER PUBLICATIONS

Iyer, et al., "NetDetect: Neighborhood Discovery in Wireless Networks Using Adaptive Beacons", Fifth IEEE International Conference on Self-Adaptive and Self-Organizing Systems, 2011, pp. 31-40.
International Search Report and Written Opinion—PCT/US2014/018653—ISA/EPO—Jun. 30, 2014.

* cited by examiner

*Primary Examiner* — Ashley Shivers
(74) *Attorney, Agent, or Firm* — Knobbe, Martens, Olson & Bear, LLP (57) ABSTRACT

According to one or more embodiments of the present disclosure, a method for autonomously adapting a discovery packet (DP) transmission frequency comprises: calculating, by an electronic processor of a device of a plurality of devices in a system, a DP transmission cycle "N", wherein the calculating further comprises: broadcasting, by the device, its own observed device number in a DP; decoding, by the electronic processor of the device, an observed device number from DPs of each detectable device of the plurality of devices in the system; computing, by the electronic processor of the device, a final observed device number for the system wherein the final observed device number is a maximum ("M") of its own observed device number and all decoded observed device numbers from DPs of the detectable devices; and based on the computed maximum ("M"), determining, by the electronic processor of the device, the DP transmission cycle "N".

37 Claims, 5 Drawing Sheets

AUTONOMOUS ADAPTATION OF DISCOVERY PACKET TRANSMISSION FREQUENCY

TECHNICAL FIELD

The present disclosure generally relates to wireless communication networks, and more particularly, to autonomous adaptation of discovery packet transmission frequency in wireless communication networks.

BACKGROUND

Current user devices (e.g., smart phones, tablets, laptops, etc.) generally have the ability to search for and connect to networks such as the Internet using wireless communication systems such as WiFi networks. Typical WiFi networks may generally use hardware such as a WiFi router connected to a wired network. Ad-hoc or social WiFi designs, on the other hand, generally do not require infrastructure or hardware connections.

In typical reference ad-hoc or social WiFi designs, a user device may detect one or more user devices in its vicinity. For example, when one or more user devices are in the neighborhood of a user device associated with a particular "hotspot", that particular user device's "hotspot" may appear on the neighboring user devices. As such, a social WiFi design may be considered as a social network for WiFi connections, which may benefit individual user devices by allowing the individual user devices to make a WiFi connection based on "hotspots" of neighboring user devices.

However, many user devices may try to access social WiFi designs at the same time. For example, there may be a common time slot or window in which each user device may search for network connections. In that regard, the user devices may send or transmit an access point beacon within a certain time slot or window. In an example, all user devices may try to detect other user devices and send an access point beacon within a 1 second window. Because this time slot or window is open to all user devices to transmit access point beacons, potential collisions may occur between the many user devices.

Accordingly, there is a need in the art for user devices to more efficiently send or transmit access point beacons.

SUMMARY

According to one or more embodiments of the present disclosure, systems and methods are provided for determining an optimum frequency for transmitting a Discovery Packet (DP) (e.g., an access point beacon) in an ad-hoc or social wireless communications network. Also, each user device in the network may randomize a Discovery Interval (DI) (e.g., a time slot or window) for which it transmits its DP such that collisions in the network may be reduced.

According to an embodiment, a method for autonomously adapting a discovery packet (DP) transmission frequency comprises: calculating, by each device of a plurality of devices in a system, a DP transmission cycle "N", wherein the calculating further comprises: broadcasting, by each device of the plurality of devices in the system, its own observed device number in a DP; decoding, by each device, an observed device number from DPs of other detectable devices in the system; computing, by each device, a final observed device number for the system, which is a maximum ("M") of its own observed device number and the decoded observed device number from the DPs of the other detectable devices; and based on the computed maximum ("M"), determining the DP transmission cycle "N".

BRIEF DESCRIPTION OF THE DRAWINGS

Like element numbers in different figures represent the same or similar elements.

DETAILED DESCRIPTION

According to one or more embodiments of the present disclosure, user devices in an ad-hoc or social wireless network may determine an optimum frequency at which to transmit a Discovery Packet (DP) (e.g., an access point beacon). User devices may transmit a DP every "N" Discovery Intervals (DI) (e.g., within every "N" time slots or windows). DP transmission frequency may be optimally determined by choosing "N", where "N" is an integer number.

Additionally, to help reduce collisions between beacon transmissions of multiple user devices in the social wireless network, each user device may randomize the DI for which it transmits its DP. That is, embodiments herein may randomize device transmission timing in each cycle of "N" DIs so that multiple devices may be less likely to always choose the same DI for transmission.

Figure 1:
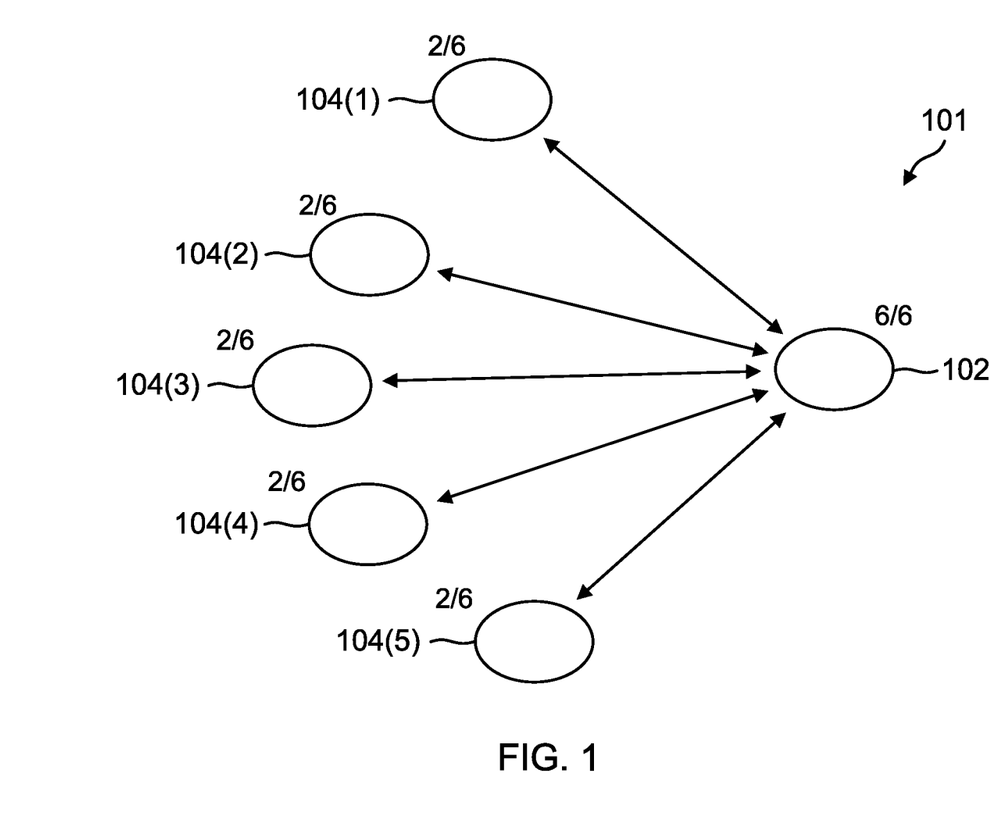
FIG. 1 is a diagram illustrating a system that includes multiple user devices where an optimum DP transmission cycle is determined according to an embodiment of the present disclosure.

Referring to FIG. 1, a diagram illustrates a system including multiple user devices where an optimum DP transmission cycle is determined according to an embodiment of the present disclosure.

In FIG. 1, a system 101, for example a wireless communications network such as an ad-hoc or social WiFi network, includes a plurality or multiple user devices 104(1)-104(5) in the vicinity of a user device 102. In that regard, neighboring user devices in proximity or in the vicinity of each other (e.g. within a certain wireless range or within a certain distance, e.g., 100 or 200 yards, within a WiFi hotspot, within Bluetooth™ range, etc.) may be detectable by each other. A detectable user device may be one for which its DP may be decoded. In this embodiment, user device 102 may detect and communicate with each one of devices 104(1)-104(5), for example, as will be described in more detail below in connection with FIG. 6 according to one or more embodiments. It should be appreciated that a system as described according to one or more embodiments herein may include different combinations of user devices.

In typical ad-hoc or social Wi-Fi designs, each user device may decide how frequently it transmits a DP based on its own observed device number, i.e., the number of devices it observes or detects in its vicinity. Specifically, a user device may transmit a DP every "N" Discovery Intervals (DI), and it may increase the DP transmission cycle "N" if it observes a high number of total devices sending DPs. That is, when a user device detects lots of user devices, the DP transmission cycle "N" typically increases.

In contrast to typical ad-hoc or social WiFi designs in which a user device may detect lots of other neighboring user devices and thus increase a cycle "N", in embodiments herein, each of user devices 102 and 104(1)-104(5) may determine its DP transmission cycle "N" based on its own observed device number as well as those broadcasted by other neighboring user devices.

Also, according to one or more embodiments of the present disclosure, a user device may choose at which DI to transmit, for example, the user device may choose to skip transmitting at every DI (e.g., time slot or window). Instead, the user device may decide to transmit less frequently if a high number of total other user devices are detected.

A less frequent transmission of DPs may help control the number of contending devices per DI. But determining DP transmission frequency based only on a user device's own observed device number, as in typical designs, may not be optimum if other user devices cannot detect each other. For example, in system 101 illustrated in FIG. 1, each one of the plurality of devices 104(1)-104(5) may respectively detect only one device, i.e., user device 102. Therefore, each one of the plurality of devices 104(1)-104(5) may send DPs frequently. As a result, the one device 102, which is able to detect each one of the plurality of devices 104(1)-104(5), may observe many DPs in each DI.

In embodiments herein, however, each user device in the system may broadcast its own observed device number and may determine the DP transmission cycle "N" based on the maximum of its own observed device number as well as those observed by other detectable devices. Each user device may broadcast its own observed device number, for example, each of user devices 104(1)-104(5) may broadcast that its observed device number is 2 (including itself), in other words, the observed device number for each of user devices 104(1)-104(5) is based on a detected user device 102 plus itself (2 devices). For user device 102, it may broadcast its observed device number of 6, that is, it detects or observes 5 devices 104(1)-104(5) plus itself (6 devices). Therefore, each user device may increase the DP transmission cycle "N" if it finds that a detectable device observes more user devices, and a reduced transmission frequency may help mitigate the contention at that detectable device.

In an embodiment, each one of user devices 104(1)-104(5) may broadcast its own observed device number and determines a cycle "N" based on the maximum of its own observed device number and those observed by other detectable devices. For example, user device 104(1) may determine its DP transmission cycle "N" based on an observed device number of 6 as communicated by device 102 compared to its own observed device number of 2 (as indicated by the numbers "2/6" referring to a device's own observed number/the number of devices observed by other neighboring devices in the system).

Also, it should be noted that in various embodiments herein, choosing the cycle "N" for determining DP transmission frequency may be based on the total number of devices in a system or network, as opposed to the number of devices contending in, for example, one DI. In that regard, a user device may scan all DIs to determine the total number of neighboring devices in the system. In an example, a user device may determine how many total devices it observed in 100 DIs. This number of total devices may then be used to determine "N" as will be described in more detail below according to one or more embodiments.

Figure 2:
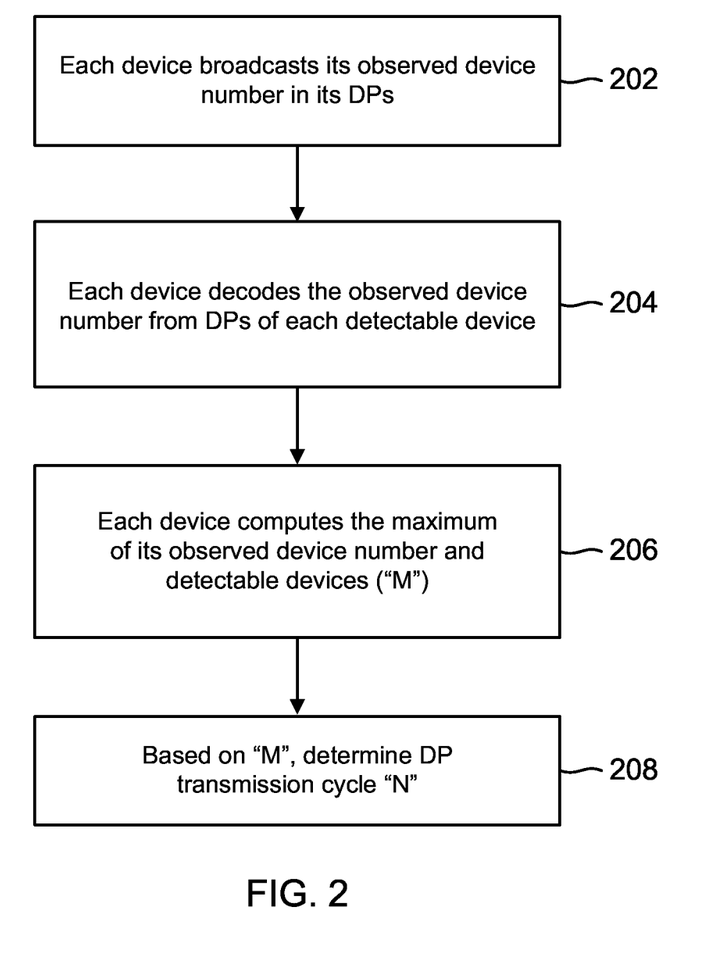
FIG. 2 is a flow diagram illustrating a method for computing a discovery packet (DP) transmission frequency according to an embodiment of the present disclosure.

Referring now to FIG. 2, a flow diagram illustrates a method for computing a discovery packet (DP) transmission frequency according to an embodiment of the present disclosure. In one or more embodiments, the method of FIG. 2 may be implemented by the system of FIG. 1.

In embodiments herein, a user device may transmit a Discovery Packet (DP) in one of every "N" Discovery Intervals (DI). If the total number of transmitting devices in a system is large, an individual device may increase its DP transmission cycle "N" to reduce the number of contending devices per DI.

In block 202, each device in a system, for example in a wireless communication system such as a WiFi network, may broadcast its observed device number in its DPs. For example, as illustrated in FIG. 1 according to an embodiment, a device 102 may detect all devices 104(1)-104(5) and hence its observed device number is "6", including itself. Each of devices 104(1)-104(5) may only detect one device 102 and hence each of those devices' observed device number is "2", including itself.

In block 204, each device may also decode the observed device number from DPs of each detectable device (i.e., each device for which its DPs may be decoded). For example, in FIG. 1, device 102 and devices 104(1)-104(5), respectively, may also decode the observed device number from DPs of each detectable device.

In block 206, each device may compute a number "M" as the maximum of its own observed device number and all detectable devices, i.e., the final observed device number for the system. For example, in FIG. 1, device 102 and devices 104(1)-104(5) may compute a number "M" (illustrated as the number "6" for each device) as the maximum of an observed device number and all detectable devices. That is, each device 104(1)-104(5) computes M=6 as the maximum of 2 and 6, which are the observed device numbers from itself ("2") and the detectable device 102 ("6"), respectively.

In block 208, based on "M", each device may determine its DP transmission cycle "N". For example, in FIG. 1, device 102 and each of devices 104(1)-104(5), may determine its DP transmission cycle "N" as follows:

$$N=\text{ceil}(M/Q),$$

N is determined by a ceiling function of M/Q, where M is the final observed device number for the system as described above, and Q is the maximum allowed device number per DI to maintain a certain collision probability requirement. For example, Q=a maximum number of devices allowed during a DI of 1 second. During this DI of 1 second, if a number of devices greater than Q is present, a collision probability may be higher than the requirement. In various embodiments Q may be obtained by simulation. For example, according to simulated results, if DI is 1 second, and if 50 devices are present, then DP collision probability may be 1 percent; if 100 devices are present, then DP collision probability may be 30 percent. As such, the maximum value for Q (maximum number of allowed devices) may be stated for a proposed length of DI.

In the embodiment of FIG. 1, assuming that a value for Q is for example, 10, the value of N may then be calculated as N=ceil (6/10)=1. As such, in this example, user devices may transmit a DP every "1" DIs (i.e., a DP within every "1" time slots or windows) for optimal DP frequency transmission.

Notably, according to one or more embodiments, the DP transmission cycle "N" may not just be based on the number of local devices as observed by a device, but instead, on the maximum number between a device's own observed number compared to each of the other detectable devices' observed number.

As such, systems and methods according to one or more embodiments may be provided for determining an optimum frequency for transmitting a DP in a system. Also, each user device in the system may randomize a Discovery Interval (DI) (e.g., a time slot or window) for which it transmits its DP such that collisions in the network may be reduced.

Figure 3:
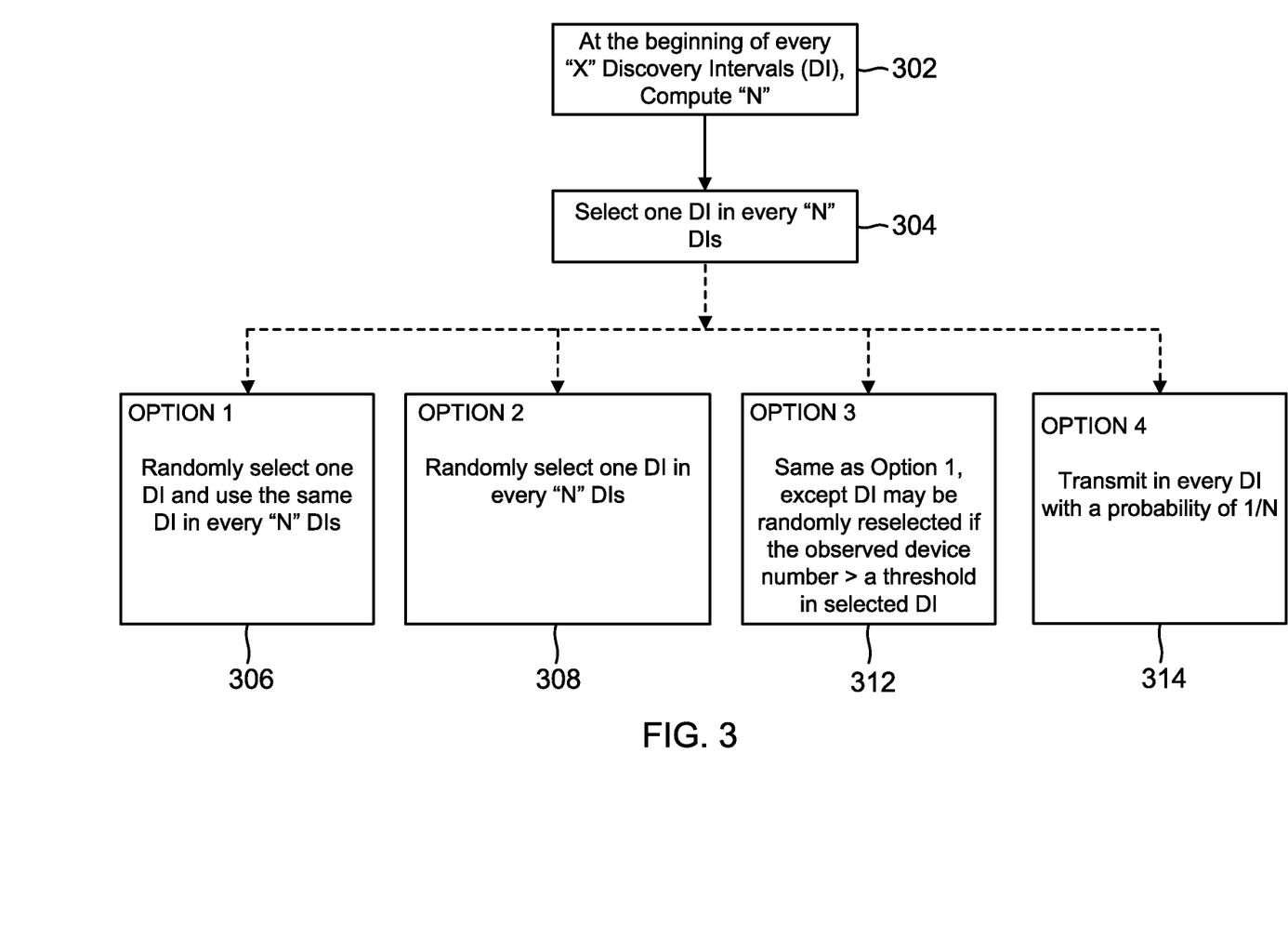
FIG. 3 is a flow diagram illustrating a method for selecting one DI in every "N" DIs to transmit a DP according to an embodiment of the present disclosure.
Figure 4:
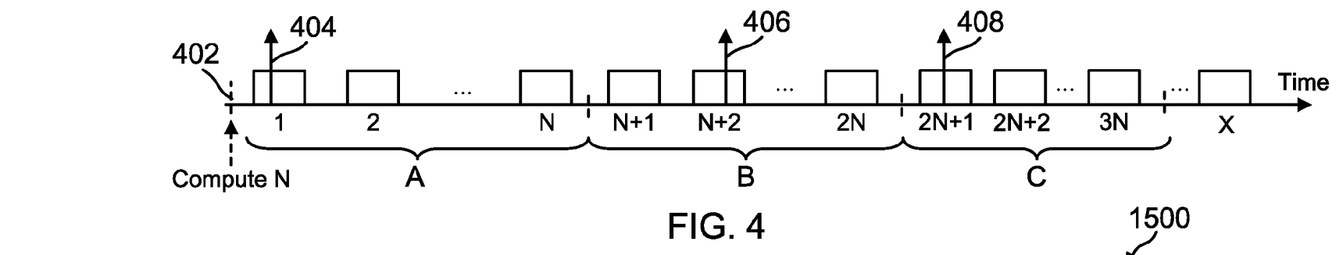
FIG. 4 is a timing diagram for selecting a DI in every "N" DIs to transmit a DP according to an embodiment of the present disclosure.

Referring now to FIG. 3, a flow diagram illustrates a method for selecting one DI in every "N" DIs to transmit a DP according to an embodiment of the present disclosure. FIG. 4 illustrates a timing diagram for selecting a DI in every "N" DIs to transmit a DP according to an embodiment of the present disclosure.

In FIG. 4, a certain total number of DIs (e.g., time slots or windows) may be included within a certain timing cycle "X". In this example, the number of DIs may be divided into one or more cycles (e.g., cycles A, B, C), each of which may correspond to a DP transmission cycle "N". For example, DIs labeled as "1", "2" ... "N" are within cycle A, DIs labeled "N+1", "N+2" ... "2N" are within cycle B, DIs labeled "2N+1" ... "3N" are within cycle C, and so on. As indicated at reference numeral 402, a DP transmission cycle "N" may be calculated at the beginning of each timing cycle "X" such that a DP may be optimally transmitted every "N" DIs.

In block 302 of FIG. 3, at the beginning of every timing cycle X having a certain number of DIs, where X>>N (as illustrated in FIG. 4), a DP transmission cycle "N" may be computed, for example, as described above with respect to FIGS. 1 and 2 according to one or more embodiments.

In block 304, after determining the DP transmission cycle "N", a device may select one DI in every "N" DIs to transmit a DP.

In blocks 306, 308, 312 and 314 of FIG. 3, random selection of DIs may be made according to one of 4 options: Option 1 (block 306), Option 2 (block 308), Option 3 (block 312), or Option 4 (block 314) (see also, FIG. 4).

Block 306, Option 1: Randomly select one DI and use the same DI in every "N" DIs for DP transmission.

For example, the device may select the first DI in every cycle of N DIs (e.g., cycles A, B, C in FIG. 4). That is, the device may select DI "1" in cycle A, DI "N+1" in cycle B, DI "2N+1" in cycle C, and so on.

Block 308, Option 2: Randomly select one DI in every "N" DIs.

For example, as illustrated in FIG. 4, DPs may be transmitted completely randomly within each cycle A B and C, for instance, a DP 404 may be transmitted within DI labeled as "1" in cycle A, a DP 406 may be transmitted within DI labeled as "N+2" in cycle B, a DP 408 may be transmitted within DI labeled as "2N+1", and so on. As such, the device may randomly select to transmit DP 404 within DI "1", DP 406 within DI "N+2", DP 408 within DI "2N+1", etc. That is, the device may select to transmit a DP within any DI in every "N" DIs. This option may prevent a worst case scenario as in Option 1 in which many devices may always select the same DI in every "N" DIs.

Block 312, Option 3: Same as Option 1, that is, randomly select one DI and use the same DI in every "N" DIs, except that the DI may be randomly reselected if the observed device number is greater than a threshold in the selected DI.

For example, if a device detects many devices (higher than a certain threshold, e.g., higher than 50 devices) in the selected DI "1", the device may randomly reselect DI "N+2" instead of DI "N+1" in the next "N" DIs.

Block 314, Option 4: Transmit in every DI with a probability of 1/N. For example, in every DI, a device may generate a random variable with a uniform distribution between 0 and 1. The device may then transmit a DP if the random variable's value is less than 1/N.

The process for selecting one DI in every "N" DIs to transmit a DP may be repeated at the beginning of every timing cycle X having a certain number of DIs.

Figure 5:
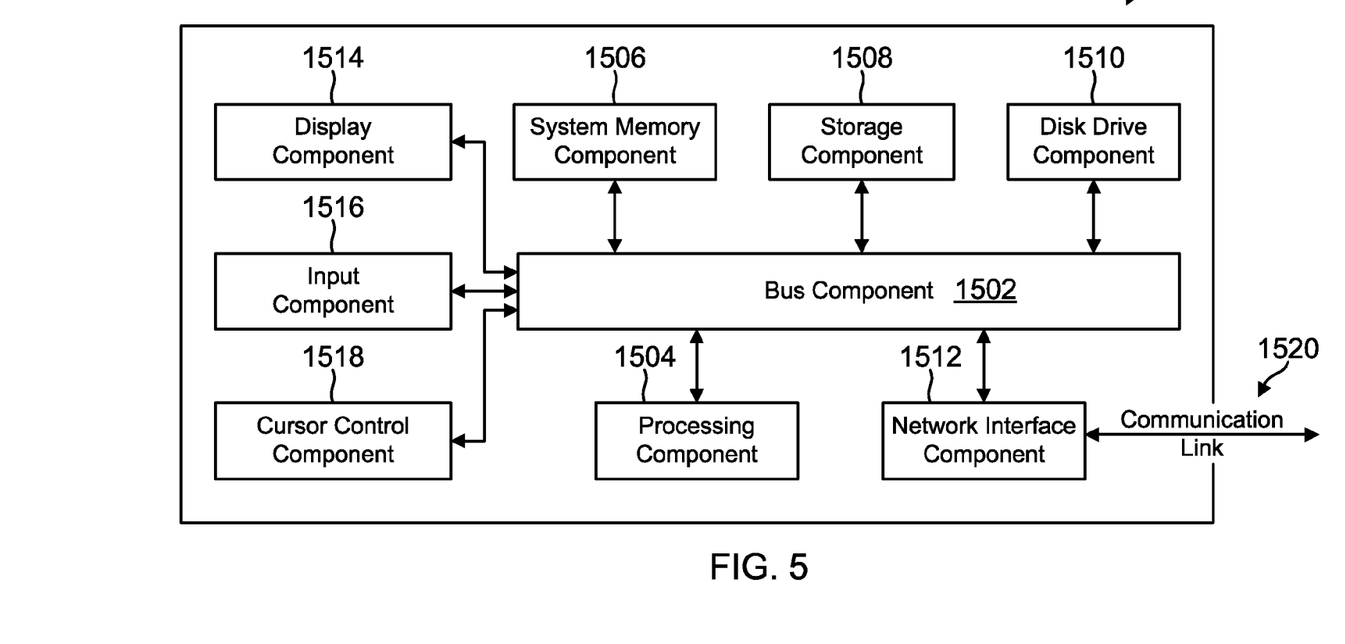
FIG. 5 is a block diagram of a system for implementing a device according to an embodiment of the present disclosure.

Referring now to FIG. 5, a block diagram of a system for implementing a device is illustrated according to an embodiment of the present disclosure.

It will be appreciated that the methods and systems disclosed herein may be implemented by or incorporated into a wide variety of electronic systems or devices. For example, a system 1500 may be used to implement any type of device including wired or wireless devices such as a mobile device, a smart phone, a Personal Digital Assitant (PDA), a tablet, a laptop, a personal computer, a TV, or the like. Other exemplary electronic systems such as a music player, a video player, a communication device, a network server, etc. may also be configured in accordance with the disclosure.

System 1500 may be suitable for implementing embodiments of the present disclosure, including user devices 102 and 104(1)-104(5) illustrated in FIG. 1. System 1500, such as part of a device, e.g., smart phone, tablet, personal computer and/or a network server, includes a bus 1502 or other communication mechanism for communicating information, which interconnects subsystems and components, including one or more of a processing component 1504 (e.g., processor, micro-controller, digital signal processor (DSP), etc.), a system memory component 1506 (e.g., RAM), a static storage component 1508 (e.g., ROM), a network interface component 1512, a display component 1514 (or alternatively, an interface to an external display), an input component 1516 (e.g., keypad or keyboard, touch screen, etc.), and a cursor control component 1518 (e.g., a mouse pad).

In accordance with embodiments of the present disclosure, system 1500 performs specific operations by processing component 1504 executing one or more sequences of one or more instructions contained in system memory component 1506. Such instructions may be read into system memory component 1506 from another computer readable medium, such as static storage component 1508. These may include instructions to autonomously adapt DP transmission frequency, etc. In other embodiments, hard-wired circuitry may be used in place of or in combination with software instructions for implementation of one or more embodiments of the disclosure.

Logic may be encoded in a computer readable medium, which may refer to any medium that participates in providing instructions to processing component 1504 for execution. Such a medium may take many forms, including but not limited to, non-volatile media, volatile media, and transmission media. In various implementations, volatile media includes dynamic memory, such as system memory component 1506, and transmission media includes coaxial cables, copper wire, and fiber optics, including wires that comprise bus 1502. In an embodiment, transmission media may take the form of acoustic or light waves, such as those generated during radio wave and infrared data communications. Some common forms of computer readable media include, for example, RAM, PROM, EPROM, FLASH-EPROM, any other memory chip or cartridge, carrier wave, or any other medium from which a computer is adapted to read. The computer readable medium may be non-transitory.

In various embodiments of the disclosure, execution of instruction sequences to practice the disclosure may be performed by system 1500. In various other embodiments, a plurality of systems 1500 coupled by communication link 1520 (e.g., WiFi, or various other wired or wireless networks as will be described in more detail below with respect to FIG. 6 according to one or more embodiments) may perform instruction sequences to practice the disclosure in coordination with one another. System 1500 may transmit and receive beacons or DPs, messages, data, information and instructions, including one or more programs (i.e., application code) through communication link 1520 and network interface component 1512. Received program code may be executed by processing component 1504 as received and/or stored in disk drive component 1510 or some other non-volatile storage component for execution.

Figure 6:
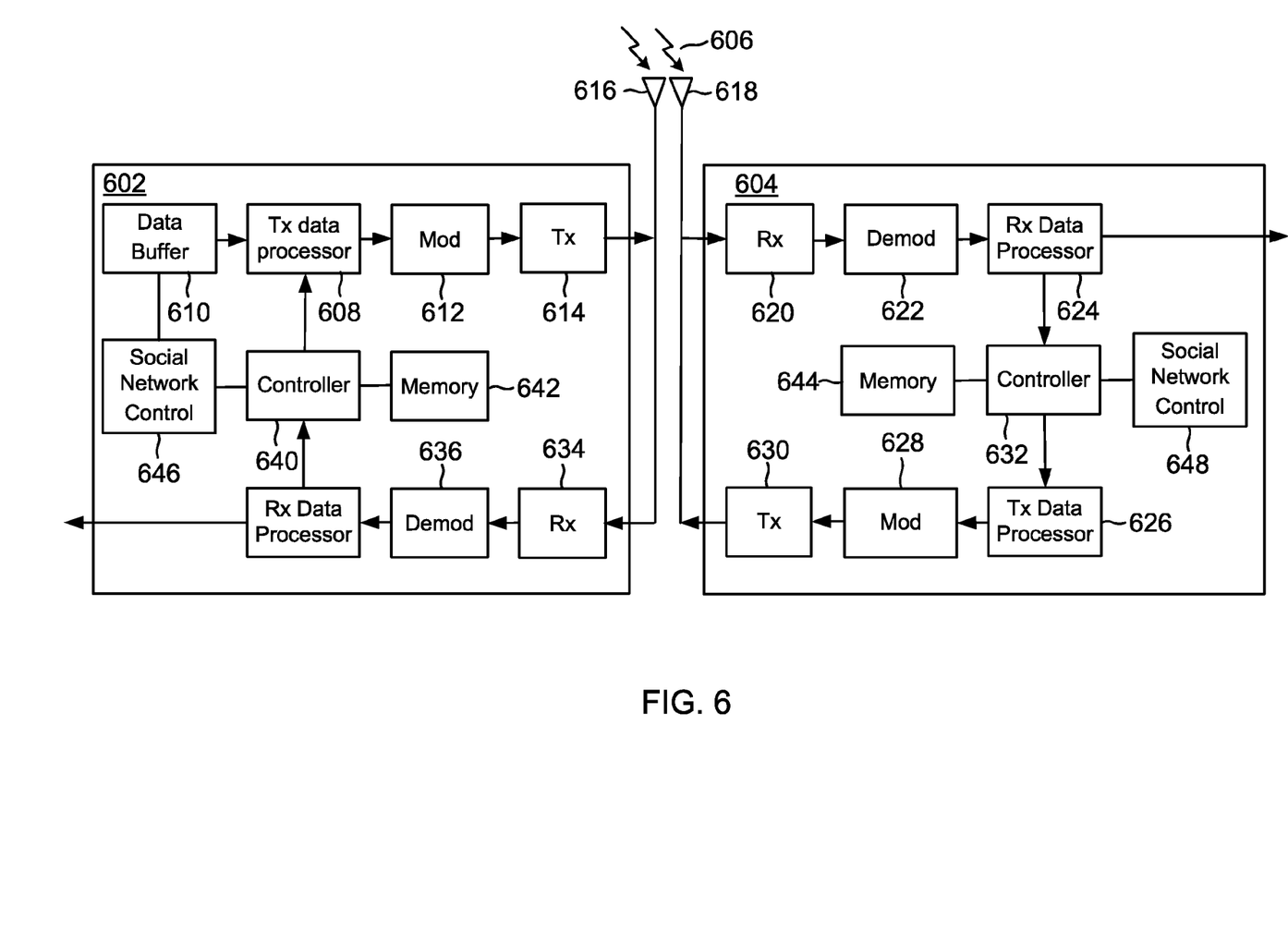
FIG. 6 is a block diagram illustrating detecting and communication components according to an embodiment of the present disclosure.

Referring now to FIG. 6, a block diagram illustrates detection and communication components according to an embodiment of the present disclosure. The components illustrated in FIG. 6 may be implemented by user devices associated with a system such as a social WiFi network, for example, user devices 102 and 104(1)-104(5) illustrated in FIG. 1 according to one or more embodiments. In one or more embodiments, the components illustrated in FIG. 6 may be used to facilitate communication between the user devices.

A user device 602 and a user device 604 are adapted to communicate via a wireless communications link 606 over an appropriate medium.

In an embodiment, components of user device 602 may facilitate sending information from user device 602 to user device 604. To begin, a transmit or TX data processor 608 may receive DPs from a data buffer component 610 or another appropriate component. TX data processor 608 may process (e.g., encodes, interleaves, maps, etc.) each DP based on a selected coding and modulation scheme. TX data processor 608 may then provide data symbols (and other pertinent modulation symbols) to a modulator 612, which performs a suitable modulation (e.g., OFDM) and/or other processing consistent with the system. Modulator 612 may then provide a stream of output chips. A transmitter or TX 614 may process (e.g., does analog conversion, filters, amplifies, etc.) the stream of output chips and may generate a modulated signal, which may then be transmitted from an antenna 616.

The modulated signals transmitted by user device 602 (as well as other signals from other user devices that may be in communication with user device 604) may be received by an antenna 618 of user device 604. A receiver 620 may process (e.g., conditions and digitizes) the received signal from antenna 618 and may provide received samples. A demodulator 622 may process (e.g., demodulates and detects) the received samples and may provide detected data symbols. A receive or RX data processor 624 may process (e.g., symbol demaps, deinterleaves, and decodes) the detected data symbols and may provide decoded data associated with each transmitting user device such as user device 602.

In one or more embodiments, components of user device 602 may also facilitate receiving information from user device 604. In this case, at user device 604, DPs may be processed by a transmit or TX data processor 626 to generate data symbols. A modulator 628 may receive the data symbols (and other pertinent modulation symbols) and may perform a suitable modulation (e.g., OFDM) and/or other processing consistent with the system. Modulator 628 may then provide an output chip stream, which may be further conditioned by a transmitter TX 630 and transmitted from antenna 618. In various embodiments, signaling may include information (e.g., relating to number of observed devices in a network) generated by a controller 632 for all user devices transmitting to user device 604.

At user device 602, the modulated signal transmitted by user device 604 may be received by antenna 616. The modulated signal may be conditioned and digitized by a receiver RX 634 and processed by a demodulator 636 to obtain detected data symbols. A receive or RX data processor 638 may process the detected data symbols and may provide decoded data (e.g., decoded DPs) for user device 602. A controller 640 may receive information to control data transmission such as adapting DP transmission frequency.

Controllers 640 and 632 may direct various operations of user device 602 and user device 604, respectively. For example, the respective controller may decode information from detectable user devices in the vicinity, determine a frequency for transmitting DPs as well as randomizing a Discovery Interval (DI) (e.g., a time slot or window) for which it transmits a DP. Memories 642 and 644 may store program codes and data used by controllers 640 and 632, respectively.

FIG. 6 also illustrates that the components may include one or more components that perform ad-hoc or social wireless network operations as described herein according to one or more embodiments. For example, a social network control component 646 may cooperate with controller 640 and/or other components of user device 602 to transmit and receive signals to one or more other user devices (e.g., user device 604). Similarly, a social network control component 648 may cooperate with controller 632 and/or other components of user device 604 to send and receive signals to another user device (e.g., user device 602).

A user device may communicate via one or more wireless communication links (e.g., link 606 or 1520) that are based on or otherwise support any suitable wireless communications technology. For example, in some aspects, a user device may associate with a network. In some aspects the network may comprise a body area network or a personal area network. In some aspects the network may comprise a local area network or a wide area network. A user device may support or otherwise use one or more of a variety of wireless communications technologies, protocols, or standards such as, for example, CDMA, TDMA, OFDM, OFDMA, WiMAX, and Wi-Fi. Similarly, a user device may support or otherwise use one or more of a variety of corresponding modulation or multiplexing schemes. A user device may thus include appropriate components (e.g., air interfaces) to establish and communicate via one or more wireless communications links using the above or other wireless communication technologies. For example, a user device may comprise a wireless transceiver with associated transmitter and receiver components that may include various components (e.g., signal generators and signal processors) that facilitate communication over a wireless medium.

As those of some skill in this art will by now appreciate and depending on the particular application at hand, many modifications, substitutions and variations can be made in and to the materials, apparatus, configurations and methods of use of the devices of the present disclosure without departing from the spirit and scope thereof. In light of this, the scope of the present disclosure should not be limited to that of the particular embodiments illustrated and described herein, as they are merely by way of some examples thereof, but rather, should be fully commensurate with that of the claims appended hereafter and their functional equivalents.

What is claimed is:

1. A method for autonomously adapting a discovery packet (DP) transmission frequency, the method comprising:
    calculating a DP transmission cycle "N", wherein the calculating further comprises:

broadcasting, by a device, its own observed device number in a DP;

decoding, by an electronic processor of the device, an observed device number from DPs of each detectable device of a plurality of devices in a system;

computing, by the electronic processor of the device, a final observed device number for the system wherein the final observed device number is a maximum ("M") of its own observed device number and all decoded observed device numbers from DPs of the detectable devices; and based on the computed maximum ("M"), determining, by the electronic processor of the device, the DP transmission cycle "N"; and after the determining of the DP transmission cycle "N", selectively transmitting in a Discovery Interval (DI) based on a random value and a value of 1/N.

2. The method of claim 1, further comprising:
after the determining of the DP transmission cycle "N", selecting one DI in every "N" DIs for DP transmission.

3. The method of claim 2, wherein the selecting further comprises:
randomly selecting one DI and using the same DI in every "N" DIs.

4. The method of claim 3, further comprising:
determining if the device's own observed device number is greater than a predetermined threshold in a selected DI; and
if the device's own observed device number is greater than the predetermined threshold in the selected DI, randomly reselecting the DI.

5. The method of claim 2, wherein the selecting further comprises completely randomly selecting one DI in every "N" DIs.

6. The method of claim 1, wherein the determining further comprises calculating the DP transmission cycle "N" at the beginning of every X DIs, wherein X is predetermined and is larger than "N".

7. The method of claim 1, wherein the system further comprises a social WiFi network.

8. A user device comprising:
one or more processors; and
one or more memories adapted to store a plurality of machine-readable instructions which when executed by the one or more processors are adapted to cause the user device to:
transmit a Discovery Packet (DP) in one of every "N" Discovery Intervals ("DI"), wherein the user device is configured to calculate "N", wherein calculating "N" further comprises:
broadcasting the user device's own observed device number in a DP;
receiving broadcasts from one or more detectable devices in a vicinity of the user device, wherein the broadcasts comprise each detectable device's own observed device number in its DP;
computing a final observed device number in the vicinity of the user device, wherein the final observed device number is a maximum ("M") of the user device's own observed device number and all the observed device numbers from DPs of the detectable user devices; and
based on the computed maximum ("M"), determining "N"; and
after the determining of "N", selectively transmit in a DI based on a random value and a value of 1/N.

9. The device of claim 8, wherein the plurality of machine-readable instructions which when executed by the one or more processors are adapted to cause the user device to:
after the determining of "N", select one DI in every "N" DIs for DP transmission.

10. The device of claim 9, wherein the plurality of machine-readable instructions which when executed by the one or more processors are adapted to cause the user device to randomly select one DI and using the same DI in every "N" DIs.

11. The device of claim 10, wherein the plurality of machine-readable instructions which when executed by the one or more processors are adapted to cause the user device to:
determine if the user device's own observed device number is greater than a predetermined threshold in a selected DI; and
if the user device's own observed device number is greater than the predetermined threshold in the selected DI, randomly reselect the DI.

12. The device of claim 9, wherein the plurality of machine-readable instructions which when executed by the one or more processors are adapted to cause the user device to completely randomly select one DI in every "N" DIs.

13. The device of claim 8, wherein the determining "N" further comprises calculating "N" at the beginning of every X DI, wherein X is predetermined and is larger than "N".

14. The device of claim 8, wherein the one or more detectable devices in the vicinity of the user device further comprise one or more devices whose DPs are decoded.

15. The device of claim 8, wherein the one or more detectable devices in the vicinity of the user device further comprise one or more devices within a certain distance, a WiFi hotspot or a Bluetooth™ range.

16. A non-transitory computer readable medium on which are stored computer readable instructions and, when executed by a processor, cause the processor to:
decode one or more observed device numbers received, respectively, from one or more detectable devices in a network;
determine a Discovery Packet (DP) transmission cycle "N" based on a maximum of an observed device number and all of the one or more observed device numbers received from the one or more detectable devices in the network; and
after the determining of the DP transmission cycle "N", selectively transmitting in a Discovery Interval (DI) based on a random value and a value of 1/N.

17. The medium of claim 16, wherein the instructions further cause the processor to increase the determined DP transmission cycle "N" when an observed device number received from a detectable device increases.

18. The medium of claim 16, wherein the instructions further cause the processor to randomize a DP transmission timing in each cycle of "N" DIs.

19. The medium of claim 16, wherein the instructions further cause the processor to transmit a DP in one of every "N" DIs.

20. The medium of claim 16, wherein the instructions further cause the processor to determine "N" as a ceiling function of the maximum of the observed device number and all of the one or more observed device numbers received from the one or more detectable devices ("M") over a maximum allowed device number per Discovery Interval ("Q").

21. A wireless communications system comprising:
a plurality of user devices operable in the wireless communications system, wherein at least one of the plurality of user devices is adapted to transmit a Discovery Packet (DP) in one of every "N" Discovery Intervals ("DI"), wherein the at least one user device is configured to calculate "N", wherein calculating "N" further comprises:
  broadcasting the at least one user device's own observed device number in a DP;
  receiving broadcasts from one or more detectable devices in a vicinity of the at least one user device, wherein the broadcasts comprise each detectable device's own observed device number in its DP;
  computing, by the electronic processor of the at least one user device, a final observed device number for the system wherein the final observed device number is a maximum ("M") of its own observed device number and all decoded observed device numbers from DPs of the detectable devices; and
  based on the computed maximum ("M"), determining "N"; and
  after the determining of "N", selectively transmit in a DI based on a random value and a value of 1/N.

22. The system of claim 21, wherein the plurality of user devices are detectable by each other such that their DPs are adapted to be decoded by each other.

23. The system of claim 21, wherein after the calculating of "N", the at least one user device is further configured to select one DI in every "N" DIs for DP transmission.

24. The system of claim 23, wherein the at least one user device is further configured to randomly select one DI and using the same DI in every "N" DIs.

25. The system of claim 24, wherein the at least one user device is further configured to:
  determine if the at least one user device's own observed device number is greater than a predetermined threshold in a selected DI; and
  if the at least one user device's own observed device number is greater than the predetermined threshold in the selected DI, randomly reselect the DI.

26. The system of claim 21, wherein the at least one user device is further configured to: calculate "N" at a beginning of every X DIs, wherein X is predetermined and is larger than "N".

27. The system of claim 21, wherein the system further comprises a social WiFi network.

28. A method comprising:
  decoding, electronically by a processor of a first device, one or more observed device numbers received, respectively, from one or more detectable devices in a network;
  determining, electronically by the processor of the first device, a Discovery Packet (DP) transmission cycle "N" based on a maximum of an observed device number by the first device compared to all the one or more observed device numbers received from the one or more detectable devices in the network; and
  after determining the DP transmission cycle "N", selectively transmitting in a Discovery Interval (DI) based on a random value and a value of 1/N.

29. The method of claim 28, further comprising increasing the determined DP transmission cycle "N" when an observed device number received from a detectable device increases.

30. The method of claim 28, further comprising randomizing a DP transmission in each cycle of "N" DIs.

31. The method of claim 28, further comprising transmitting a DP in one of every "N" DIs.

32. The method of claim 28, further comprising determining "N" as a ceiling function of the maximum of the observed device number by the first device and all the one or more observed device numbers received from the one or more detectable devices ("M") over a maximum allowed device number per Discovery Interval ("Q").

33. An apparatus operable in a social wireless network, comprising:
  means for decoding one or more observed device numbers received, respectively, from one or more detectable devices in the social wireless network;
  means for determining a Discovery Packet (DP) transmission cycle "N" based on a maximum of an observed device number compared to all the one or more observed device numbers received from the one or more detectable devices in the social wireless network; and
  means for selectively transmitting in a Discovery Interval (DI) based on a random value and a value of 1/N after the determining of the DP transmission cycle "N".

34. The apparatus of claim 33, further comprising means for increasing the determined DP transmission cycle "N" when an observed device number received from a detectable device increases.

35. The apparatus of claim 33, further comprising means for randomizing a DP transmission in each cycle of "N" DIs.

36. The apparatus of claim 33, further comprising means for transmitting a DP in one of every "N" DIs.

37. The apparatus of claim 33, further comprising means for determining "N" as a ceiling function of the maximum of the observed device number and all the one or more observed device numbers received from the one or more detectable devices ("M") over a maximum allowed device number per Discovery Interval ("Q").

* * * * *